(12) United States Patent
Yamaguchi

(10) Patent No.: US 7,057,757 B2
(45) Date of Patent: Jun. 6, 2006

(54) E-MAIL PRINTING APPARATUS AND METHOD AND E-MAIL PRINTING PROGRAM

(75) Inventor: Kotaro Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 09/922,645

(22) Filed: Aug. 7, 2001

(65) Prior Publication Data

US 2002/0054336 A1 May 9, 2002

(30) Foreign Application Priority Data

Aug. 8, 2000 (JP) ............................. 2000-239754

(51) Int. Cl.
- G06K 1/00 (2006.01)
- H04N 1/00 (2006.01)
- G06F 15/00 (2006.01)

(52) U.S. Cl. .................... 358/1.15; 358/407; 358/1.16; 715/531

(58) Field of Classification Search .................. 358/1.1, 358/1.11, 1.16, 1.18, 462, 101, 1.15, 407; 715/531
See application file for complete search history.

(56) References Cited

U.S. PATENT DOCUMENTS

| 6,160,631 A | 12/2000 | Okimoto et al. ........... 358/1.15 |
| 6,704,118 B1* | 3/2004 | Hull et al. ................. 358/1.15 |
| 2004/0236719 A1* | 11/2004 | Horvitz ......................... 707/1 |

FOREIGN PATENT DOCUMENTS

| JP | 08-36470 | 2/1996 |
| JP | 08-063309 | 3/1996 |
| JP | 08-305518 | 11/1996 |
| JP | 06-098122 | 4/1998 |
| JP | 10-187370 | 7/1998 |
| JP | 11-85419 | 3/1999 |
| JP | 11-134266 | 5/1999 |
| JP | 11-187226 | 7/1999 |
| JP | 11-312068 | 11/1999 |
| JP | 11-353262 | 12/1999 |
| JP | 10-320331 | 12/2004 |

* cited by examiner

Primary Examiner—Kimberly Williams
Assistant Examiner—Thomas J. Lett
(74) Attorney, Agent, or Firm—Fitzpatrick, Cella, Harper & Scinto

(57) ABSTRACT

The print of received E-mail is limited to prevent a large quantity of meaningless pages of the received mail from being printed. For example, E-mail is printed up to a predetermined line, or E-mail exceeding the predetermined lines is not printed.

17 Claims, 11 Drawing Sheets

FIG. 1

```
Received: from sendmail.aaa.net.com ([134.22.233.44]) by sendmail.aaa.net.com (8.7.4/3.4W3) with
ESMTP id NAA18236; Wed, 5 Jul 2000 13:52:55 +0900 (JST)
Message-ID:<000c01bfe747 $ ee74f5c0 $ 900916ac @ aaa.net.com>
From sender @ aaa.net.com
To receiver @ aaa.bet.com
Subject: test
Date: Thu, 6 Jul 2000 21:44:24 +0900
MIME-Version: 1.0
Content-Type: text
```
— MIME HEADER 101

```
Hello!!
This is the world
```
— MAIL BODY 102

```
bigin 666 image.tif
M/;%= .".FDP @ # JBU6OPU200SX @@ $ &?" L@G' 6(- $ R;! TX=I' OB9#6>X $ 2P2UC
M IXT) ZWS2GB, ¥O!(>M_P/KX17CA (`` #>F [HJ ^ Z [L@1<*5GA8KBMX>].@1<KS_
M $ X4TZZ [HB7 ]_>AT [[3@8¥F¥8Z $ GKPG $ 1 ^ J (GN; [HB I XN80! P8QQ=T1=] $ 2 (
M¥SH/9D71VX, 409# C97W" N+0<71&OG+_, 6. ¥94+IQZ7X./RY%7¥2K_Z (O>D<)
M ` X; XVB: IFF' Z $ U%>,LB6' BOIC_B¥Z83<KRL $ YX (E¥1 ^ YN) HFDI%2Y7P+-Q
M $ X4TZZ [HB7 ]_>AT [[3@8¥F¥8Z $ GKPG $ 1 ^ J (GN; [HB I XN80! P8QQ=T1=] $ , 2 (
MTS1-TT1CRN, M (B+&@S01%9)>F $ W * ¥418>, # GG*¥IWTU3 * ^ [X_ $ 7EX7A2BVWGN
MCKTW [F, /8N<Q; D; /' CNY6_(-'M ^ EXU ] ^ GYNFJ501-TW3WR4, ` &ZUIVF: IHG >
ME. 7! $ Q' R [$ TB [M) TF!%O5 [1' I * X ]382GJ93EQZ%] U. 1% (417NQMWTS3NZ%W=
M). G=L4DM $ ? XL ^ 0>_+Q1 [C/3=-46L ]-TT0X80!PJ [NF. 9HF>M/0 $ C) /4A3
M, 3%ONL/D>' U6)%+7GB: B: RIE ^ 7%H $ G6XHBB $ Z&] WTS1-TT3O [R9) [XY->K7¥
MF?P/WO=UUKNHSTW35%HN3=- $ E! ^ N!5] TS1- $ [W1%1% $ HH@ 3<+@IM- $ CB-9
MD4C1U7V¥; RIE ^ 7%H $ G47+CQ<B [KF. 9JZKYL0%44? N>] BDUYRGZ ^ 5!=D/Z`Q`
M_9R, UFTB#=-DRC1 ` 7!#RDW3- $ WT1CL2+_ $ C2!, 1N E. ` :_/BH0A7=U7RDVE
M+#_V) R+OPX6"' Q` =T ] I ] W80 ( [B/W76Q, DV ^ 055F0XSBQ [, US;IJF $ CQOFB9>
M` @/@! L ^ ; IFF: F $ VGCK_&U48· X A-< IXHT>*¥"!=#9+G3· 4L/W9=]) 5PX>%"
MM $ *FJ? NZ" 1' <1 ^ Z [V%1 U, <] OKU+<=PGYKUNSDW35" (63=-43@H ` W/1%, TS1-
M $ [ UIH%E5! 4IONB=ZTSVIXXU>4Q%N2. VN7C25¥CY. EV@IHK<T35/W=1, BN (_<
MNV-CGGQHQNA7W'>] Z2B ^ <], TE0@ 13=, 43VH ` W (B) IFF ) GK30/ ^ J J4WC3MZ
MT [ A3QX, U9460VETUT50JBO ^ @>OB>G#7-' 5?-R&" ^ ¥B]. S: F). MN1O3G*4G?
M ^ 7=NFJ: 2F&B. JC ^ 1 7! C?EW1%WT1I (@H7 I>F*#IW95%T [ M3Q" ' VO, "3G*6M ^
M71&O7#4ZR!7Q>5G1-4W3- $ UE7E8WE; N>/3. F&>/Z@<]¥' R> M9SP¥OQ1] $ 8 ^ _
M ` X; XVB IFF, Z $ U%>, LB6' BOIC_B¥Z83<KRL $ YX (E¥1 ^ YN) HFDI% $ 2Y7P+-Q
M ^, ,' R; 7X6&<, 1_C3", 7, QF/W>R, ; LD_V+AT_/CW # 1-1>]OFJ9SE# ^ NI%W
M. 3%ONL/D>' U6)%+7GB B RIE ^ 7%H $ G6XHBB $ Z&] WTS1-TT3O [R9 ] [XY->K7¥
M, 3%ONL/D>' U6)%+7GB: B. RIE ^ 7%H $ G6XHBB $ Z%] WTS1-TT3O [R9 ] [XY->K7¥
MM $ *FJ? NZ" 1' <1 ^ Z [V%1 U, <] OKU+<=PGYKUNSDW35" (63=-43@H ` W/1%, TS1-
M $ [ UIH%E5! 4IONB=ZTSVIXXU>4Q%N2. VN7C25¥CY. EV@IHK<T35/W=1, BN (_<
```
— IMAGE DATA (RECOGNIZED AS MAIL BODY) 103

FIG. 2

MIME HEADER 201:
```
Received: from sendmail.aaa.net.com ([134.22.233.44]) by sendmail.aaa.net.com (8.7.4/3.4W3) with
ESMTP id NAA18236; Wed, 5 Jul 2000 13:52:55+0900 (JST)
Message-Id: <200007050456.NAA27050@aaa.net.com>
Date: Wed, 05 jul 2000 13:56:45+0900
From: sender@aaa.net.com
To: receiver@aaa.net.com
Subject: test
MIME-Version: 1.0

Content-Type: multipart/mixed; boundary="--------------------"
```

MAIL BODY 202:
```
--------------------
Content-Type: text/plain; charset=US-ASCII Hello !!
This is the world
```

MIME HEADER 203:
```
--------------------
Content-Type: image/tiff; name="sample.tif"
Content-Transfer-Encoding: base64
```

IMAGE DATA 204:
```
KElgYXJTZWFyY2hBY3RpdmVKb2JJbmZvKCkgGyRCJEgkPSR0OEYkUz1QJDckckRJMkMbKElg
MDYuMTkgc2hpbm8gKi8NCj4gaW50OCQ1IhclNIXYJjaEFjdG12ZUpvYkluZm9IGFyUkxvY2Fs
RFAvQIZTUk9PVC9zcmMvG1waXQvQ29weS9jb21tb24vYXJSU2VsZnNvcHIdGFOdXMuYyx2
DQpyZXRyaW5WV2aW5IHJIdmlzaW9uIDEuNjANCnJldHJpZXpXZZpbmcgcmV2aXNwb24gMS42MQ0K
ZGlmZiAtcjEuNjAgLXIxLjYyCoyMWMyMSwyNQ0KPCAgKloqKloqKloqKloqKloqKloqKloq
QjIoTXOkRyEGhyCQWN0aZIGyRCJE46RKF3Py4ckRJMkMbKEINCj4gICAoBskQjRYP3Qb
DQo+IDAwLzA2LzE5DQo+ICAgQjRyRCJzIhOCVnJYYwSj51JClkazt+JE4bKEJj21wbGV0ZRsk
QjIoTXOkRyEGhyCQWN0aZIGyRCJE46RKF3Py4ckRJMkMbKEINCj4gICAoBskQjRYP3Qb
KElgYXJTZWFyY2hBY3RpdmVKb2JJbmZvKCkgGyRCJEgkPSR0OEYkUz1QJDckckRJMkMbKElg
QjIoTXOkRyEGhyCQWN0aZIGyRCJE46RKF3Py4ckRJMkMbKEINCj4gICAoBskQjRYP3Qb
KloqKloqKloqKloqKloqKlowKMTI2YTEzMSwxMzNNCj4gLyogQWRkICRWxDIwMAu
MDYuMTkgc2hpbm8gKi8NCj4gaW50OCQ1IhclNIXYJjaEFjdG12ZUpvYkluZm9IGFyUkxvY2Fs
Sm9iSW5mbyogKTsNCj4gDQo0NzksNDg2ZDQ4NQoKPCAJCQkJYXJJSQ19ERUJVR19QUkkOVDYo
ImFyIDO+PiBbIFJTZWxmcmlFOgSUQwPSVkIFN0YXQwPQwPSVkIFNOYXRFNOYREMD01ZCBJRDE9JWQgU3Rh
QjIoTXOkRyEGhyCQWN0aZIGyRCJE46RKF3Py4ckRJMkMbKEINCj4gICAoBskQjRYP3Qb
KElgYXJTZWFyY2hBY3RpdmVKb2JJbmZvKCkgGyRCJEgkPSR0OEYkUz1QJDckckRJMkMbKElg
KQ0KPiANCj4gKloqKloqKloqKloqKloqKloqKloqKloqKloqKloqKloqKloqKloqKloqKloq
QjIoTXOkRyEGhyCQWN0aZIGyRCJE46RKF3Py4ckRJMkMbKEINCj4gICAoBskQjRYP3Qb
MDYuMTkgc2hpbm8gKi8NCj4gaW50OCQ1IhclNIXYJjaEFjdG12ZUpvYkluZm9IGFyUkxvY2Fs
Sm9iSW5mbyogKTsNCj4gDQo0NzksNDg2ZDQ4NQoKPCAJCQkJYXJJSQ19ERUJVR19QUklOVDYo
ImFyIDO+PiBbIFJTZWxmcmlFOgSUQwPSVkIFN0YXQwPQwPSVkIFNOYXRFNOYREMD01ZCBJRDE9JWQgU3Rh
ImFyIDO+PiBbIFJTZWxmcmlFOgSUQwPSVkIFN0YXQwPSVkIFNOYXRFNOUQPT09PT09PT09PT0NCUDyBmaWxlIOiAv
RFAvQIZTUk9PVC9zcmMvG1waXQvQ29weS9jb21tb24vYXJSU2VsZnNvcHIdGFOdXMuYyx2
MDYuMTkgc2hpbm8gKi8NCj4gaW50OCQ1IhclNIXYJjaEFjdG12ZUpvYkluZm9IGFyUkxvY2Fs
ImFyIDO+PiBbIFJTZWxmcmlFOgSUQwPSVkIFN0YXQwPSVkIFNOYXRFNOYREMD01ZCBJRDE9JWQgU3Rh
                              :
                              :
```

E-MAIL PRINTING APPARATUS AND METHOD AND E-MAIL PRINTING PROGRAM

BACKGROUND OF THE INVENTION

1. Field of the Invention

The invention relates to an E-mail printing apparatus for executing a print of E-mail, its E-mail printing method, and a memory medium.

2. Related Background Art

In recent years, in association with the spread of a network using the LAN (Local Area Network) or WAN (Wide Area Network), information exchanging means by Email through Intranet/Internet has generally been used. A mechanism for transferring E-mail will be briefly explained. First, E-mail data is formed by E-mail client software (hereinafter, simply referred to as a UA (User Agent)) and transmitted to a nearest E-mail transfer apparatus (hereinafter, simply referred to as an MTA (Mail Transfer Agent)). According to the MTA, received E-mail is stored into an auxiliary memory device in the apparatus and transmitted to the MTA to which the mail should be transferred next. A similar transfer process is repetitively executed among a plurality of MTAs existing between the sender and a final destination, so that the E-mail is transferred to the final MTA as if a bucket was passed from one person to another person. Finally, the E-mail is stored into a memory device in an E-mail apparatus serving as a final destination, or the received E-mail is stored into a memory device in a reception E-mail administration server having a mail box (post-office box) for administrating the received E-mail every E-mail user. After that, the E-mail is extracted and processed every user by the UA.

Generally, in many cases, the UA is used on a personal computer (hereinafter, referred to as PC). The user can browse contents of the E-mail sent to himself by the PC. Further, if there is a printer which can be used from the PC, the received E-mail can be also printed by using the printer. However, in this case, the user needs to actively perform a printing operation to the printer by using some applications. Particularly, in case of the user who needs to periodically print the received mail, since it is necessary to periodically execute the printing operation every time, means for automatically printing the received mail is demanded by such a user. To meet such a request, in recent years, an apparatus such that by making the UA operative on the printer, the printer directly receives E-mail of a specific destination and automatically prints the E-mail without needing the printing operation of the user has also been proposed.

Among the foregoing apparatuses, there is also an apparatus which can also print image data annexed to E-mail. In such an apparatus, if MIME information in the E-mail, which will be explained hereinlater, is imperfect, there is a case where the annexed image data is printed as body text data of the E-mail. Even if the image data itself is printed as text data, it is merely printed as a meaningless character train and a print result is usually obtained by tens of pages.

Therefore, a large quantity of wasteful pages are printed eventually.

SUMMARY OF THE INVENTION

It is an object of the invention to provide an apparatus which can prevent a situation such that since MIME information in received E-mail is imperfect, when annexed image data or the like is printed as text data, a large quantity of wasteful pages are printed.

To accomplish the above object, according to the invention, there is provided an E-mail printing apparatus comprising: receiving means for receiving E-mail; and limiting means for limiting a print of the E-mail received by the receiving means.

According to the invention, there is provided an E-mail printing method comprising: a receiving step of receiving E-mail; and a limiting step of limiting a print of the E-mail received by the receiving step.

According to the invention, there is provided an E-mail printing program comprising: a receiving step of receiving E-mail; and a limiting step of limiting a print of the E-mail received by the receiving step.

BRIEF DESCRIPTION OF THE DRAWINGS

FIG. 1 is a diagram showing E-mail data whose MIME information is imperfect;

FIG. 2 is a diagram showing normal E-mail data;

DETAILED DESCRIPTION OF THE PREFERRED EMBODIMENT

Figure 3:
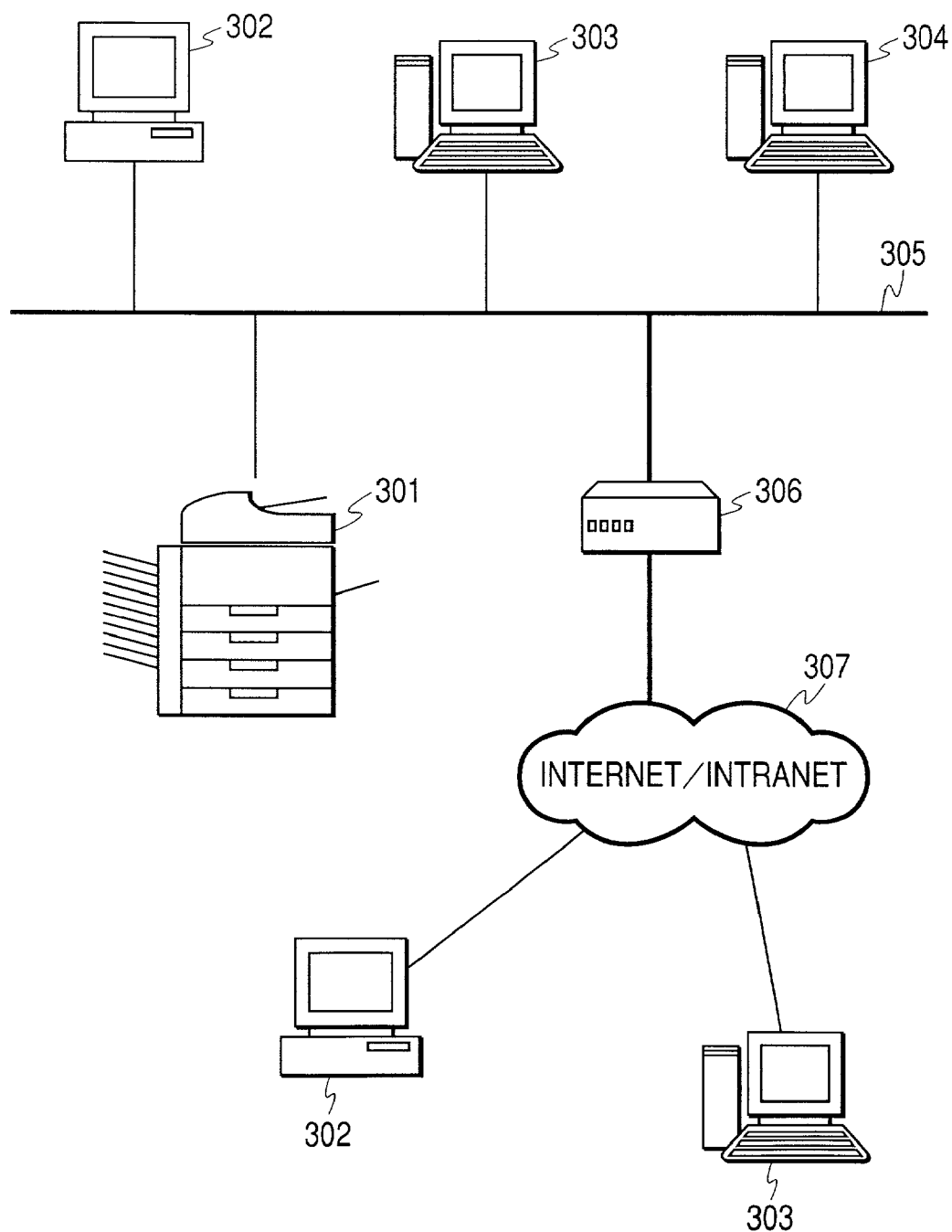
FIG. 3 is a system constructional diagram showing a connection between an image forming apparatus and a network according to the invention.

FIG. 3 is a system constructional diagram showing a connection between an image forming apparatus and a network according to the invention.

A mail client 301 and an image forming apparatus 304 of the invention are connected by a local area network (LAN) 305 and their mail boxes are allocated to an auxiliary memory device of a mail server 302. The image forming apparatus 304 of the invention has a transmitting and receiving function of E-mail. Further, the image forming apparatus is connected to Internet/Intranet 307 of different domains through a remote router 306 by using a DNS server 303 having a function for performing mutual conversion between a domain name and an IP address and can communicate E-mail with the apparatuses existing on the LAN and with the mail server 302 and mail client 301 connected to the Internet/Intranet.

Figure 4:
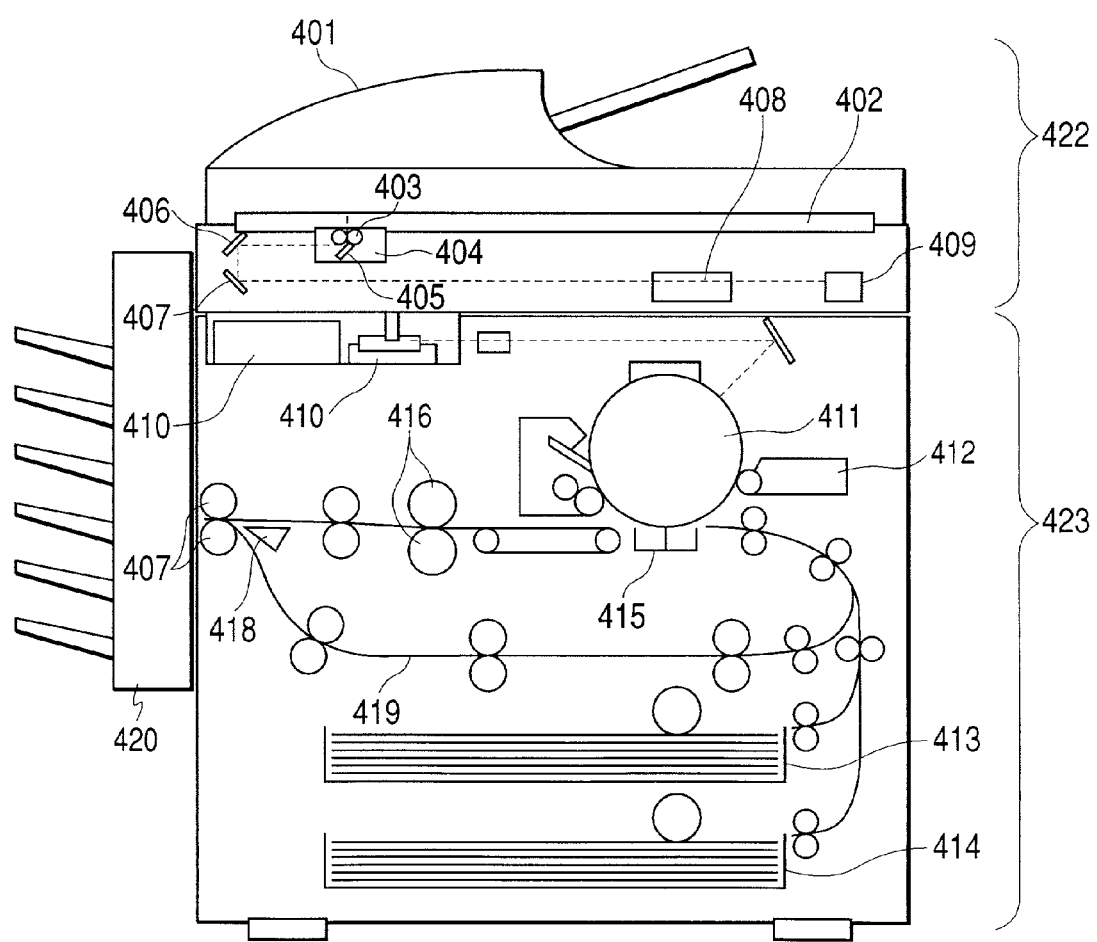
FIG. 4 is a cross sectional view of a reader and a printer.

FIG. 4 is a cross sectional view of a reader 422 and a printer 423 of the image forming apparatus of the invention.

A document feeder 401 of the reader 422 feeds an original one sheet by one from the last page onto a platen glass 402 and delivers the original on the platen glass 402 after completion of the reading operation of the original. When the original is conveyed onto the platen glass 402, a lamp 403 is lit on, the movement of a reader unit 404 is started, and the original is exposed and scanned. Reflection light from the original at this time is guided to a CCD image sensor (hereinafter, referred to as a CCD) 409 by mirrors 405, 406, and 407 and a lens 408. An image of the original scanned as mentioned above is read by the CCD 409. Image data which is outputted from the CCD 409 is subjected to predetermined processes and, thereafter, transferred to the printer 423 and a control unit 517.

A laser driver 421 of the printer 423 drives a laser emitting unit 410 and allows the laser emitting unit 410 to emit a laser beam according to the image data outputted from the reader 422. The laser beam is irradiated onto a photosensitive drum 411, so that a latent image according to the laser beam is formed on the photosensitive drum 411. A developing agent is adhered onto the portion of the latent image on the photosensitive drum 411 by a developing unit 412. At timing synchronized with the start of the irradiation of the laser beam, a recording paper is fed out from either a cassette 413 or 414 and conveyed to a transfer unit 415. The developing agent adhered onto the photosensitive drum 411 is transferred onto the recording paper. The recording paper on which the developing agent has been adhered is conveyed to a fixing unit 416. The developing agent is fixed onto the recording paper by heat and a pressure of the fixing unit 416. The recording paper which passed through the fixing unit 416 is delivered by delivery rollers 417. A sorter 420 encloses the delivered recording paper onto each bin, thereby sorting the recording paper. If a sorting mode is not set to the sorter 420, the recording paper is enclosed onto the top bin. If a duplex recording mode is set, the recording paper is conveyed to the delivery rollers 417 and, thereafter, the rotating direction of the delivery rollers 417 is reversed and the recording paper is conveyed to a refeed conveying path 419 by a flapper 418. If a multiplex recording mode is set, the recording paper is conveyed to the refeed conveying path 419 lest it is conveyed to the delivery rollers 417. The recording paper conveyed to the refeed conveying path is fed to the transfer unit 415 again at the foregoing timing.

Figure 5:
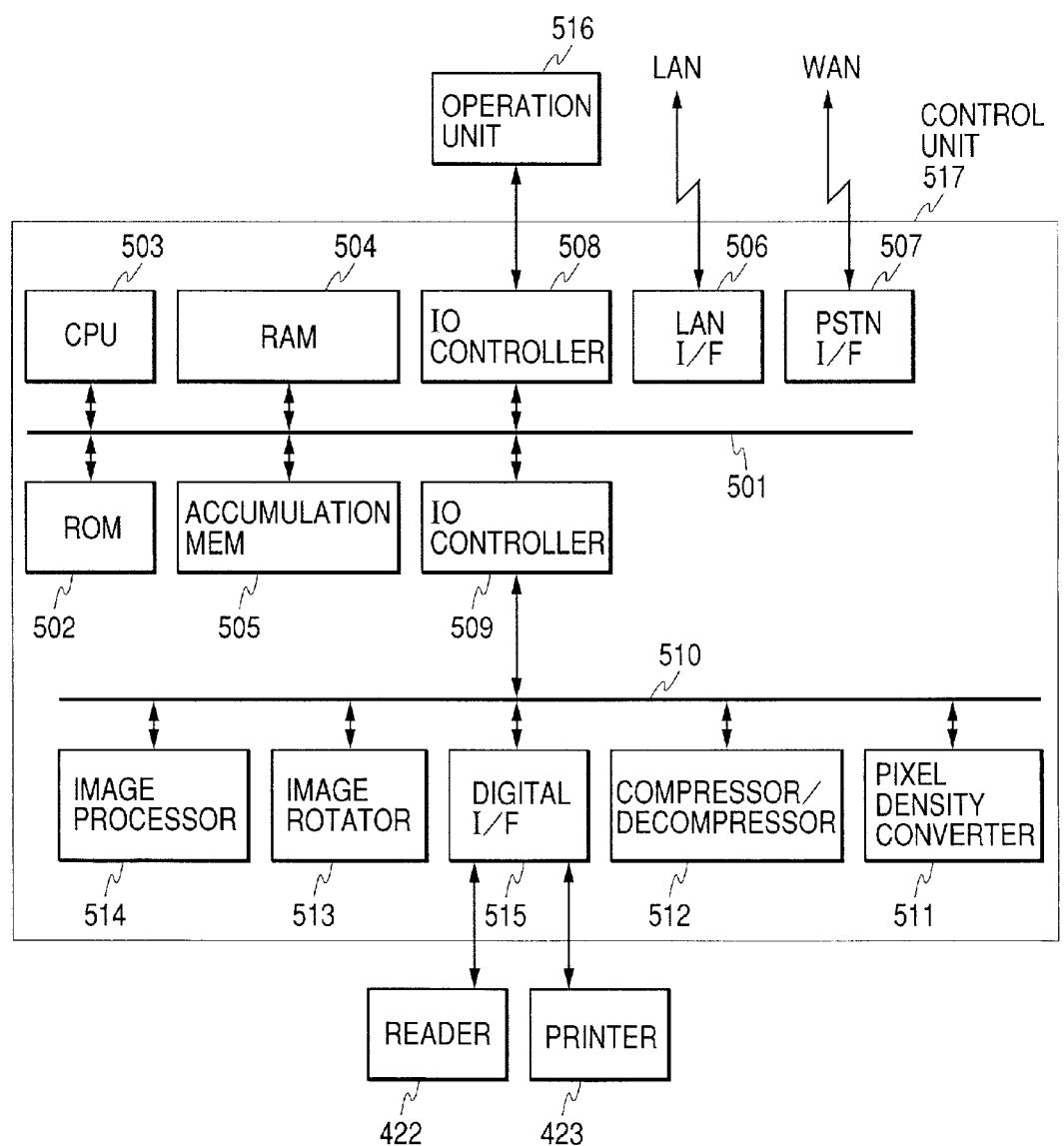
FIG. 5 is a block diagram of a control unit.

FIG. 5 is a block diagram of the control unit 517 of the image forming apparatus of the invention.

Each component element of the control unit 517 is connected to a system bus 501 and an image bus 510. An ROM 502 is a boot ROM in which a boot program of the system has been stored. System software for realizing each means of the invention has been stored in the ROM 502 or an accumulation memory 505 and is executed by a CPU 503. An RAM 504 is a system work memory area for executing the software and is also an image memory for temporarily storing the image data. The system software, E-mail data, image data, and the like are stored into the accumulation memory 505. An LAN I/F 506 is an interface for connecting to the LAN and it is connected to the Internet by an apparatus such as a remote router or the like connected to the LAN. A PSTN I/F 507 is connected to the ISDN or a public telephone network, is controlled by a communication control program in the ROM 502 and has a function for transmitting and receiving data to/from a remote terminal through an ISDN I/F, a modem, or an NCU (Network Control Unit), or the like.

The above devices are arranged on the system bus 501. An IO controller 509 is a bus bridge for connecting the system bus 501 to the image bus 510 for transferring the image data at a high speed. The image bus 510 is constructed by a PCI bus or IEEE1394. The following devices are arranged on the image bus 510. A digital I/F 515 connects the reader 422 and printer 423 to the control unit 517 and executes a conversion of a synchronous system/asynchronous system of the image data. An image processor 514 executes a correction, a modification, and an edition to the input image data and the output image data. An image rotator 513 rotates the image data. An image compressor/decompressor 512 executes a compressing/decompressing process of JPEG to multivalue image data and executes a compressing/decompressing process of JBIG/MMR/MR/MH to binary image data. A pixel density converter 511 executes a resolution conversion or the like to the output image data.

An IO controller 508 is an interface with an operation unit 516 and outputs the image data to be displayed to the operation unit 516 from the system bus 501 side to the operation unit 516. The IO controller 508 also plays a role for transferring information inputted by the user through the operation unit 516 to the CPU 503.

Figure 6:
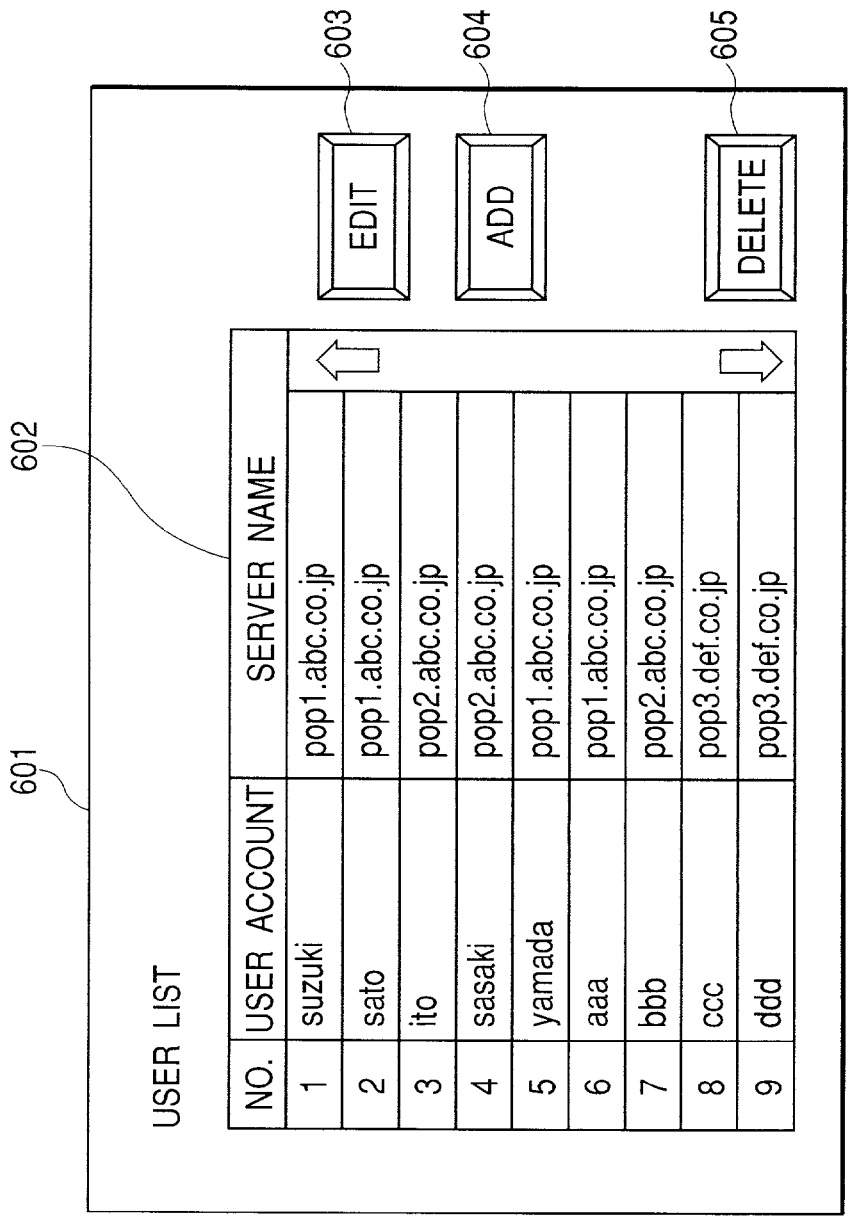
FIG. 6 is a diagram showing a user account list picture plane which is displayed on an operation unit.

FIG. 6 shows a list picture plane 601 of a user account in case of receiving E-mail from the image forming apparatus of the invention.

This picture plane is displayed on the operation unit 516 of the image forming apparatus. Through this picture plane, the user can set a user account in case of receiving E-mail to the image forming apparatus. The image forming apparatus receives the E-mail from the mail server 302 in accordance with the user account set here. The user reception accounts which have already been set are displayed in a user list 602. In case of newly setting a user account, a details setup picture plane 701 is opened by pressing an "add" button 604. On this picture plane, the user sets the user account or the like. In case of changing set contents of the user account which has already been set, the user account as a target to be changed is selected from the user list 602. After that, the details setup picture plane 701 is opened likewise by pressing an "edit" button 603. The set contents of the user account or the like which had already been set have previously been displayed on this picture plane. The user can change the set contents by overwriting them. In case of deleting the user account which has already been set, the user account as a target to be deleted is selected from the user list 602. After that, by pressing a "delete" button 605, the designated user account is deleted from the user list 602.

Figure 7:
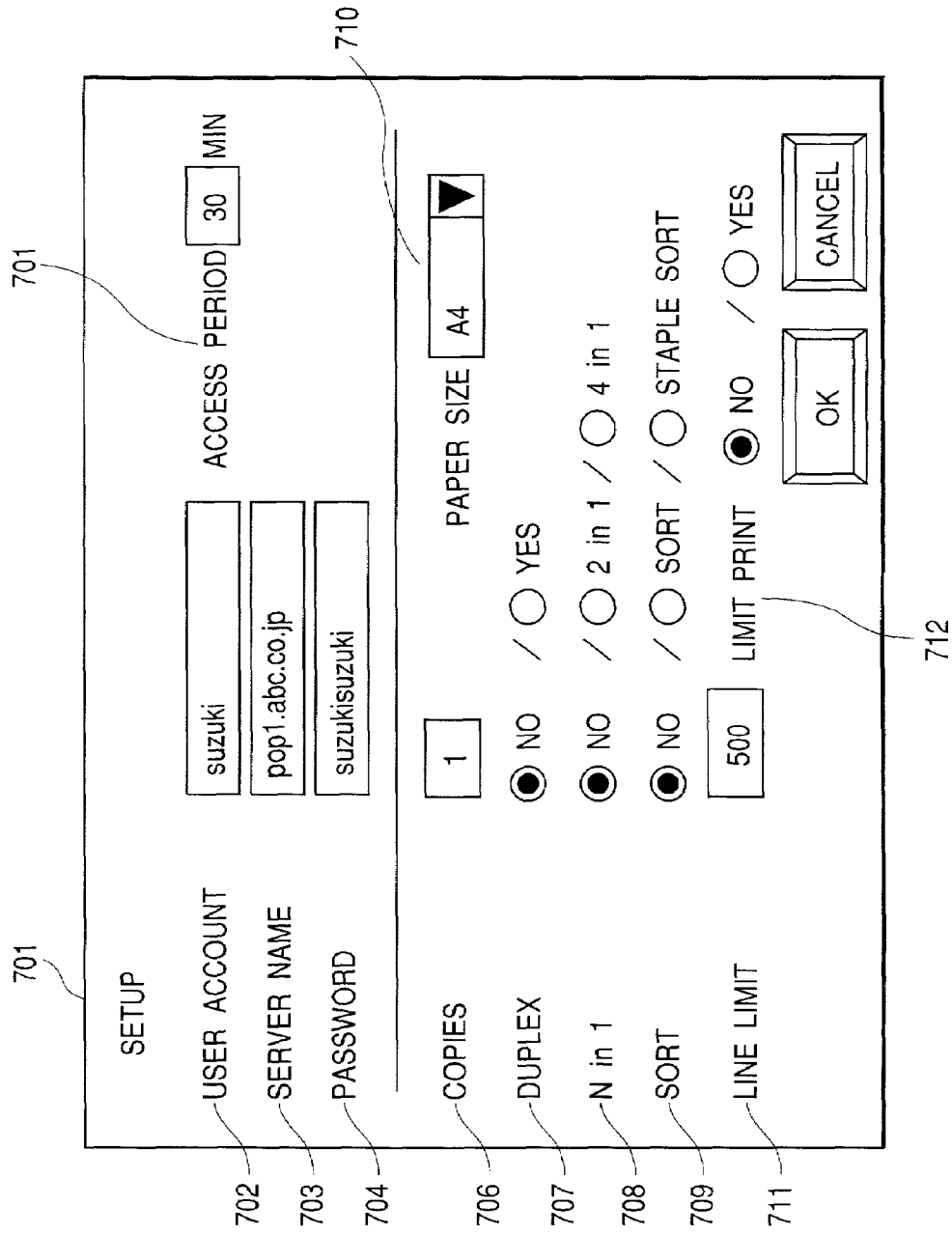
FIG. 7 is a diagram showing a details setup picture plane of a user account which is displayed on the operation unit.

FIG. 7 is a details setup picture plane of the user account.

The mail server 302 in FIG. 3 is called a POP (Post Office Protocol) server and has a function for distributing the received E-mail to the mail box (post-office box) of each destination and accumulating it. The UA can extract the E-mail accumulated in the specific mail box in the mail server 302 by using a protocol called POP. The UA has been installed in the image forming apparatus of the invention and the E-mail accumulated in the mail box in the mail server 302 can be directly extracted. On the details setup picture plane 701, the image forming apparatus of the invention can designate the mail server and mail box on the destination side from which the E-mail should be extracted and can perform various print setup in case of printing the extracted E-mail by the printer 423.

An address of the mail server on the destination side from which the E-mail should be extracted is set into a server name input area 703 on the details setup picture plane 701. The name of the mail box in the mail server from which the E-mail should be extracted is set into a user account input area 702. A password for accessing to this mail box is set into a password input area 704. A time period for which the image forming apparatus of the invention accesses to the mail server is set into an access period input area 705. In accordance with the time period set here, the image forming apparatus of the invention periodically accesses to the mail server and extracts the E-mail accumulated in a predetermined mail box. The extracted E-mail is printed by the printer 423 in accordance with the print setup contents in setting areas 706 to 710. The number of print copies in case of printing one E-mail, that is, an arbitrary numerical value in a range from 1 to 99 is set into a copies input area 706. In the case where the E-mail to be printed exists on a plurality of pages, whether it is printed on both sides of the print paper or not is set into a duplex print setting area 707. In the case where the E-mail to be printed exists on a plurality of pages, whether the plural pages are reduced and collectively printed onto the print paper of one page or not is set into an (N in 1) setting area 708. In case of reducing, either a mode to collectively print two pages onto the print paper of one page or a mode to collectively print four pages onto the print paper of one page can be selected. If a plural-copy printing mode is designated, either a mode to sort a delivery bin of the sorter 420 every copy or a mode to staple the print papers every delivery bin in the case where the print papers are sorted and delivered is set into a sort setting area 709. A size of paper which is used for printing is set into a paper size setting area 710. A limit value of the number of lines in case of printing body text data in the received E-mail data is set into a line limit setting area 711. If the number of lines of the body text data exceeds this limit value, the image data is printed to the lines up to the limit value and the subsequent lines are not printed. For example, "0" is set as a limit value, the limitation of the number of lines is not provided but the printing is unlimitedly performed.

Figure 8:
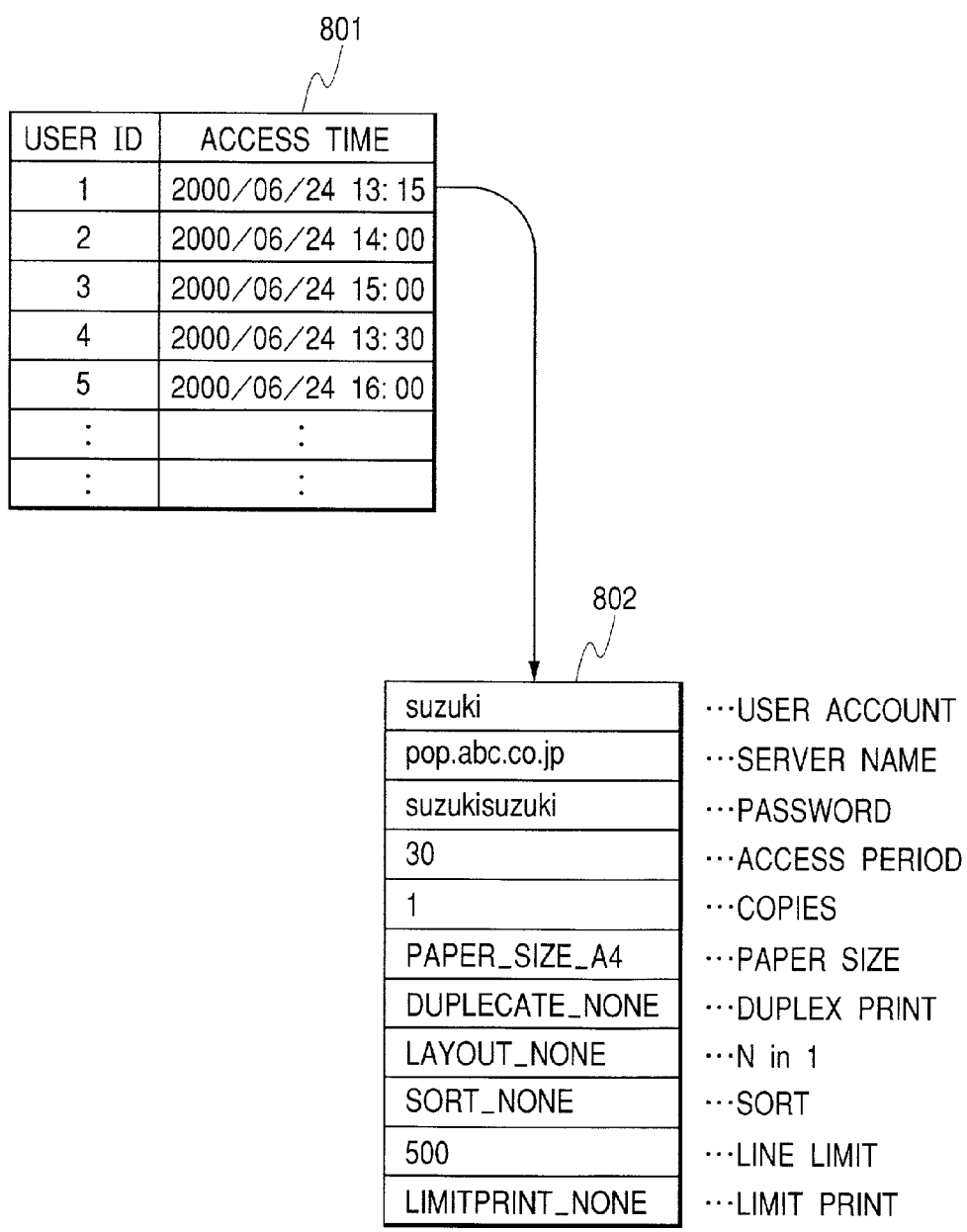
FIG. 8 is a diagram showing a holding state of details setup information of a user account in an RAM.

FIG. 8 is a diagram showing a state where the contents set on the details setup picture plane 701 of the user account are held in the RAM 504 of the control unit 517 of the image forming apparatus.

All of the set user accounts have been held as a user account list 801 in the RAM 504. Contents of each account comprise a user ID unconditionally distributed every account and a scheduled time when the mail server is accessed next. A details setup information list 802 held in another area on the RAM 504 is linked to each user account. On a control program of the image forming apparatus, the details setup information list 802 of each user account can be traced from the user account list 801. In this details setup information list 802, contents of the user account, server name, password, access period, copies, paper size, duplex print designation, N in 1 designation, and sort designation which were set on the details setup picture plane 701 in FIG. 5 have been held.

Figure 9:
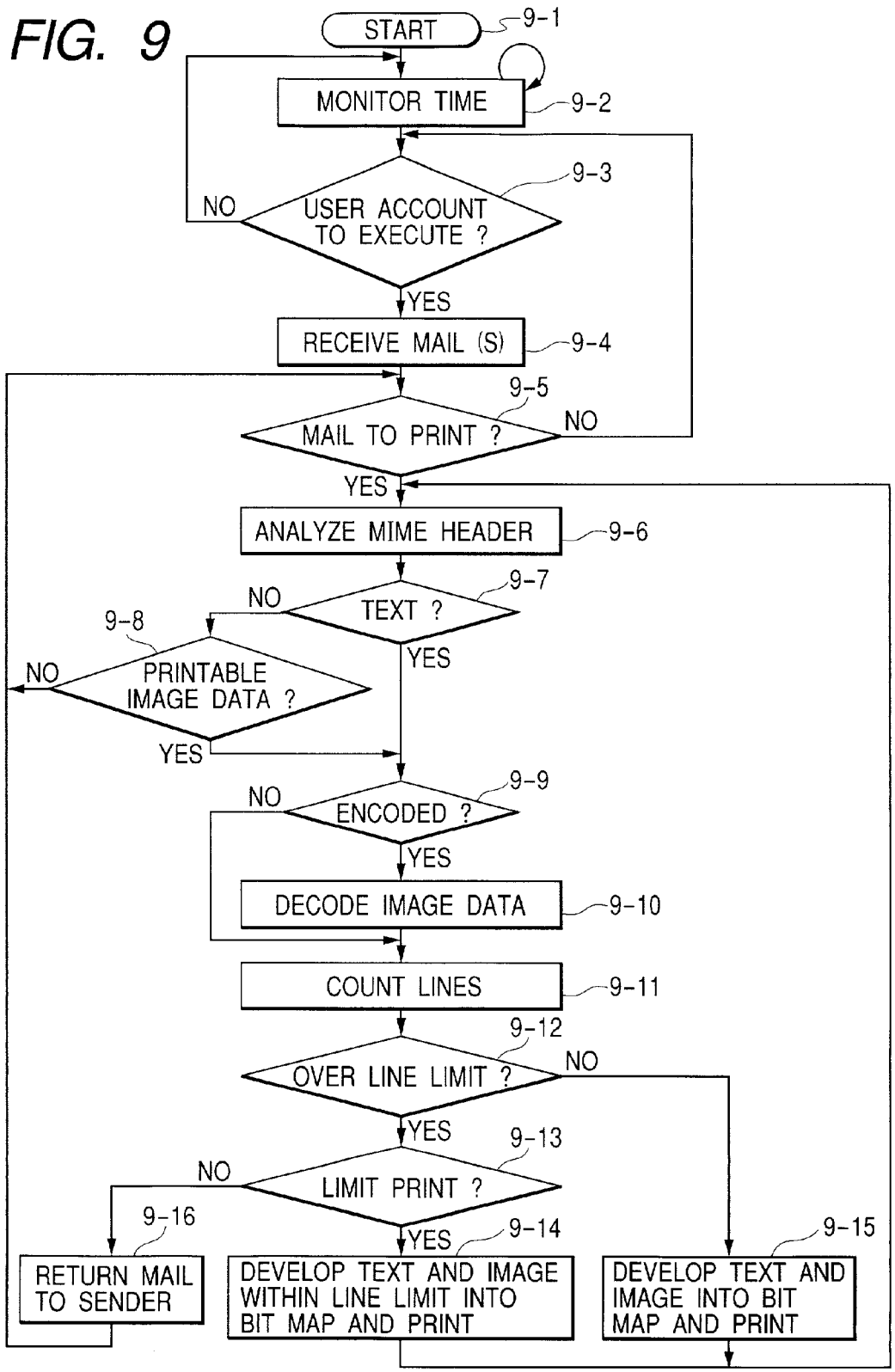
FIG. 9 is a flowchart showing E-mail receiving and printing processes by a plurality of user accounts.

FIG. 9 is a flowchart in the case where the image forming apparatus of the invention receives E-mail and prints it. A flow of processes of the image forming apparatus of the invention will now be described with reference to FIG. 9. A program according to the flowchart of FIG. 9 has been stored in the ROM 502 and is read out and executed by the CPU 503.

When a power source of the image forming apparatus of the invention is turned on and the system is started (step 9-1), the apparatus first enters a time monitoring mode (9-2). In this state, the system always monitors the present time which is calculated on the basis of internal clocks and compares it with the access time in the user account list 801 (9-3). If the present time coincides with the access time or if the user account whose present time exceeds the access time exists in the list, the system starts a process for accessing to the mail server. The system reads out the details setup information list 802 linked to the user account as a processing target and obtains the user account, server name, and password information therefrom. On the basis of the obtained information, the system accesses to the target mail server and receives the E-mail in the mail box designated by the user account (9-4). At this time, although there is a case where a plurality of E-mail exist in the mail box, the apparatus receives all of the E-mail data in the mail box and accumulates them into the accumulation memory 505. Subsequently, the accumulated E-mail data is read out one by one from the accumulation memory 505 and sequentially subjected to printing processes, which will be explained hereinlater. At a point when the accumulated E-mail data is extinguished in the accumulation memory 505, the processing routine is returned to a process for discriminating the presence or absence of the user account which should be executed again (9-5).

In the printing process, first, an MIME (Multipurpose Internet Mail Extensions) header in the E-mail data is first analyzed (9-6). The MIME header is an identifier indicative of an arrangement of data in the E-mail, a data format, and the like. Contents of the MIME header have been standardized by the International Standard regulations called RFC (Request for Comment). Since the E-mail data which is transmitted onto the Internet certainly has to be expressed by ASCII character codes, in case of Japanese text data including non-ASCII characters or binary data such as image data or the like, it is necessary to once encode such data into ASCII character codes and transmit them. An encoding method or the like in this instance can be also expressed by the MIME header.

FIG. 2 shows an example of ordinary E-mail data in which image data is annexed to E-mail. From a description of "multipart/mixed" of an MIME header 201, the apparatus first recognizes the fact that data of a plurality of formats exist in the subsequent data. From a description of "boundary="----------"", the apparatus also recognizes the fact that the data of each format is divided by a delimiter of "----------". Subsequently, the apparatus analyzes the MIME headers after the first delimiter. From a description of "text/plain" and "US-ASCII", the apparatus recognizes the fact that subsequent data 202 is the text data of the ASCII character codes (9-7). Since the text data 202 is not encoded, the number of lines of the text data is counted without performing the decoding process (9-11). In the apparatus, a print amount of the body text data can be limited. The apparatus discriminates whether the number of lines of the body text exceeds the limited number of lines set in the line limit setting area 711 in FIG. 7 or not (9-12). If NO, the body text data is developed as it is into a bit map memory and the data developed in the memory is printed by the printer 423 of the apparatus in accordance with various print setup contents held in the details setup information list 802 (9-15). Processes which are executed in the case where the number of lines exceeds the limited number will be explained hereinlater. Further, an MIME header 203 after the next delimiter is analyzed (9-6). From a description of "image/tiff" and "base64", it is recognized that subsequent data 204 is image data of a TIFF format encoded by a base 64 format (9-8). Since the apparatus can handle the image data of the TIFF format, after the image data 204 is decoded (9-10), it is developed into the bit map memory and printed as mentioned above (9-15). For example, if the data of the format which cannot be handled by the apparatus exists, the reading of only its data portion is skipped. After that, the foregoing series of processes is repeated and the printing process is executed until the received E-mail data is extinguished.

After completion of the printing processes of all of the received E-mail, the apparatus overwrites the value obtained by adding the access periods to the access time in the user account list 801 as a processing target and updates the access time to the scheduled time of the next access. The processing routine is returned to the time monitoring mode (9-2).

FIG. 1 shows an example of E-mail data in which the image data is annexed to the E-mail in a manner similar to FIG. 2. However, the description of the MIME header is imperfect. Among the E-mail application software used in the world, there is software for transmitting the E-mail in the data format as shown in the example in FIG. 1. When the apparatus receives such E-mail, from a description of "text" in an MIME header 101, it is interpreted that the subsequent data is text data. However, actually, since encoded image data 103 exists after body text data 102, if this data is printed as it is, the image data 103 portion is also printed as meaningless text data. Ordinarily, if the encoded image data is printed as text data, it is printed to tens of pages, so that a large quantity of wasteful pages are printed. However, since the fact that the image data is included in the E-mail data is not described in the MIME header 101, the apparatus cannot recognize the existence of the image data. Therefore, the print amount of the body text data can be limited in the apparatus. The apparatus first counts the number of lines of the body text data (9-11). Whether the count value exceeds the limited number of lines set in the line limit setting area 711 in FIG. 7 or not is discriminated (9-12). If YES, the processes are further distributed in accordance with the setup contents in a limit print setting area 712 in FIG. 7 (9-13). If a check box "YES" is marked in the limit print setting area 712, the apparatus develops the body text data of the number of lines up to the limited value into the bit map memory, prints it, and abandons the data in the portion exceeding the limit value (9-14). If a check box "NO" is marked in the limit print setting area 712, the apparatus transmits the E-mail data as it is to a sender (transmitting source address destination) as follows (9-16). The transmitting source address in this case is an E-mail address designated by a "From:" header described in the mail header of the E-mail data. Similarly, if the E-mail address designated by a "Reply-To:" header exists in the mail header, the data is preferentially transmitted to those address destinations. By the foregoing series of processes, even if the image data is recognized as body text data, it is possible to prevent a large quantity of wasteful pages from being printed.

Although the print amount of the body text data is limited by the number of lines in the embodiment, even if it is limited by the number of characters or a data size, a similar effect can be obtained. In this case, in place of the line limit setting area 711 in FIG. 7, a character number limit setting area or a data size limit setting area is provided and the user is allowed to previously set an arbitrary value. The apparatus first discriminates whether the number of characters of the body text data or the data size exceeds the limit value or not. If YES, the body text data up to the limit value is developed into the bit map memory and printed in accordance with the setup contents in the limit print setting area 712. The data in the portion exceeding the limit value is abandoned, or the E-mail data is transmitted as it is to the transmitting source address destination without performing the printing process of the E-mail data.

Even if the print amount is limited by the number of print pages, a similar effect can be obtained. In this case, in place of the line limit setting area 711 in FIG. 7, a page number limit setting area is provided and the user is allowed to previously set an arbitrary value. The apparatus first discriminates whether the number of pages in case of printing the body text data exceeds the limit value or not. If YES, the body text data up to the limit value is developed into the bit map memory and printed in accordance with the setup contents in the limit print setting area 712. The data in the portion exceeding the limit value is abandoned, or the E-mail data is transmitted as it is to the transmitting source address destination without performing the printing process of the E-mail data.

Figure 10:
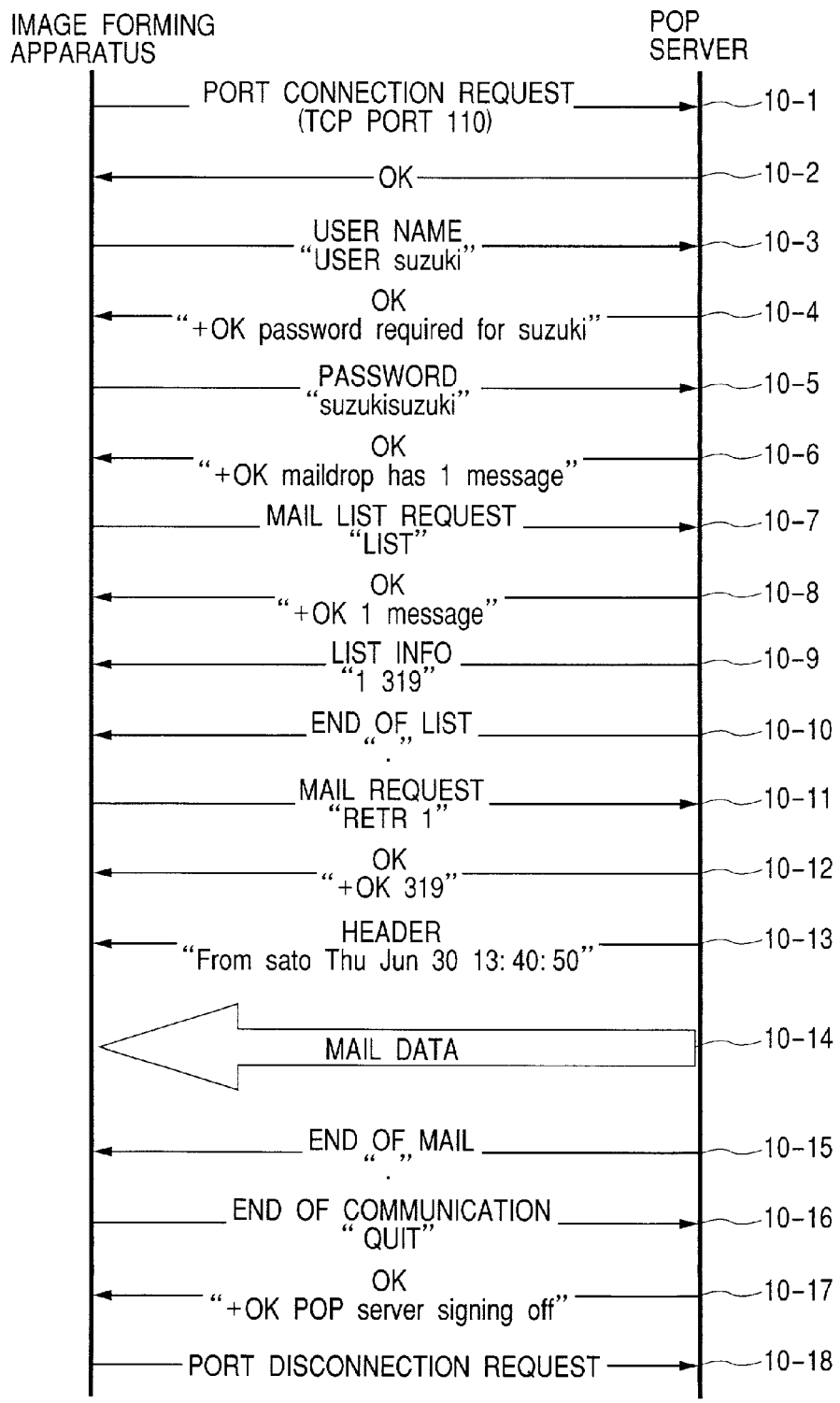
FIG. 10 is a diagram showing a communicating procedure in case of receiving E-mail from a mail server.

FIG. 10 is a diagram showing a communicating procedure in the case where the image forming apparatus of the invention accesses to the mail server and receives E-mail.

The image forming apparatus of the invention and the mail server performs communication by using the protocol called POP. This protocol is located in an upper layer of the protocol called TCP/IP and its control data flows on the network in a form such that it is contained in a TCP packet.

First, the image forming apparatus sends a port connection request 10-1 to a TCP port No. 110 of the mail server. When the server returns "OK" 10-2 in response to such a request, the communication by the TCP/IP is established at this point of time. Subsequently, the image forming apparatus sequentially sends a user name 10-3 and a password 10-5 to the server. When the server returns "OK" 10-4 and 10-6 in response to them, user authentication to the mail box is made at this point of time. The image forming apparatus subsequently sends a mail list request 10-7 of the E-mail accumulated in the designated mail box and receives list information 10-9 from the server. Contents of the list information 10-9 in the example of FIG. 10 denote "the data size of the first E-mail is 319 bytes". After that, since the server sends an end of list 10-10, it will be understood that only one E-mail exists in this mail box. If a plurality of E-mail exist, the list information 10-9 is repetitively sent the number of times as many as the number of E-mail. Subsequently, the image forming apparatus sends a mail request 10-11 and receives mail data 10-14 from the server subsequently to a header (mail header information) 10-13. Finally, an end of communication 10-16 and a port disconnection request 10-18 are sequentially sent. The series of communication is finished.

In the embodiment, an example in which the mail server different from the image forming apparatus of the invention exists outside and the E-mail is received from this server by using the POP has been described. However, a similar effect can be also obtained even by a form such that the server function is incorporated in the image forming apparatus of the invention.

Figure 11:
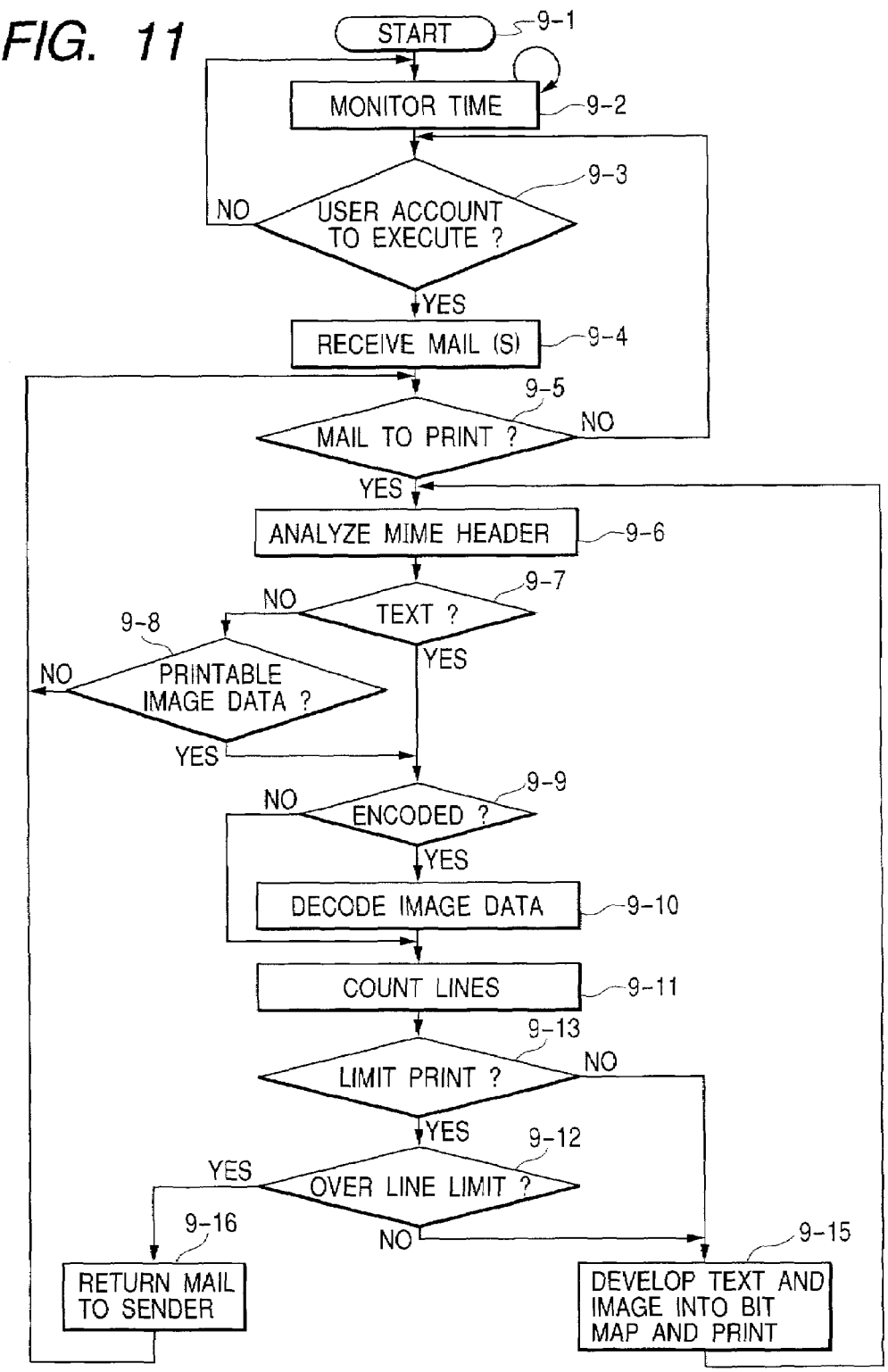
FIG. 11 is a flowchart showing E-mail receiving and printing processes by a plurality of user accounts.

Processes in step 9-12 and subsequent steps in FIG. 9 can be also modified as shown in FIG. 11. Since the processes up to step 9-11 are similar to those in FIG. 9, their description is omitted here and processes in step 9-11 and subsequent steps will be explained. Whether the limit print has been designated or not is discriminated in step 9-13. If YES, step 9-12 follows and whether the number of lines exceeds the limited number of lines or not is discriminated. If YES, step 9-16 follows. If NO, step 9-15 follows. In this manner, the E-mail exceeding the data amount which is limited when the user designates the limit print is not printed. If the user does not designate the limit print, the printing is executed irrespective of the data amount which is limited.

Further, the embodiment in which the data is not printed according to step 9-16 can be replaced with an embodiment in which the data is printed up to the limited number of lines in step 9-14.

As described above, according to the invention, for example, in the case where the annexed image data or the like is printed as text data because the MIME information of the received E-mail is imperfect, it is possible to prevent a large quantity of wasteful pages from being printed.

What is claimed is:

1. An E-mail printing apparatus comprising:
   a reception unit, adapted to receive E-mail;
   a setting unit, adapted to set a print limit;
   a discrimination unit, adapted to discriminate upon printing the E-mail received by said reception unit, whether or not the E-mail exceeds the print limit set by said setting unit; and
   a print unit, adapted to print the E-mail received by said reception unit if said discrimination unit discriminates that the E-mail does not exceed the print limit set by said setting unit, and not to print the E-mail if said discrimination unit discriminates that the E-mail exceeds the set print limit.

2. An apparatus according to claim 1, wherein said setting unit sets the print limit for the number of print sheets.

3. An apparatus according to claim 1, wherein said setting unit sets the print limit for the number of lines.

4. An apparatus according to claim 1, wherein said reception unit receives the E-mail in accordance with a predetermined access interval.

5. An E-mail printing method comprising the steps of:
   receiving E-mail;
   setting a print limit;
   discriminating upon printing the E-mail received in said receiving step, whether or not the E-mail exceeds the print limit set by said setting step; and
   printing the E-mail received in said receiving step if said discrimination step discriminates that the E-mail does not exceed the print limit set in said setting step, and not printing the E-mail if said discrimination step discriminates that the E-mail exceeds the set print limit.

6. A method according to claim 5, wherein said setting step sets the print limit for the number of print sheets.

7. A method according to claim 5, wherein said setting step sets the print limit for the number of lines.

8. A method according to claim 5, wherein said receiving step receives the E-mail in accordance with a predetermined access interval.

9. A computer-readable storage medium storing a computer program for executing an E-mail printing method, said computer program comprising:
   code for a receiving step of receiving E-mail;
   code for a limiting step of limiting a printing of the E-mail received by said code for the receiving step;
   code for a discriminating step of discriminating whether or not a limited printing of the E-mail is to be performed,
   wherein if said code for the discriminating step discriminates that the limited printing is to be performed and the E-mail exceeds a predetermined amount, said code for the limiting step does not print the E-mail,
   wherein if said code for the discriminating step discriminates that the limited printing of the E-mail is to be performed and the E-mail does not exceed the predetermined amount, said code for the limiting step prints the E-mail, and
   wherein if said code for the discriminating step discriminates that the limited printing of the E-mail is not to be performed, said code for the limiting step prints the E-mail.

10. A computer-readable storage medium storing a computer program for executing an E-mail printing method, said computer program comprising:
    code for a receiving step of receiving E-mail;
    code for a setting step of setting a print limit;
    code for a discriminating step of discriminating upon printing the E-mail received by said code for the receiving step, whether or not the E-mail exceeds the print limit set by said code for the setting step; and
    code for a printing step of printing the E-mail received by said code for the receiving step if said code for the discriminating step discriminates that the E-mail does not exceed the print limit set by said code for the setting step, and for not printing the E-mail if said code for the discriminating step discriminates that the E-mail exceeds the set print limit.

11. A storage medium according to claim 10, wherein said code for the setting step sets the print limit for the number of print sheets.

12. A storage medium according to claim 10, wherein said code for the setting step sets the print limit for the number of lines.

13. A storage medium according to claim 10, wherein said code for the receiving step receives the E-mail in accordance with a predetermined access interval.

14. A computer program embodied on a storage medium executing an E-mail printing method, said program comprising:
    code for a receiving step of receiving E-mail;
    code for a setting step of setting a print limit;
    code for a discriminating step of discriminating upon printing the E-mail received by said code for the receiving step, whether or not the E-mail exceeds the print limit set by said code for the setting step; and
    code for printing the E-mail received by said code for the receiving step if said code for the discriminating step discriminates that the E-mail does not exceed the print limit set by said code for the setting step, and not printing the E-mail if said code for the discriminating step discriminates that the E-mail exceeds the set print limit.

15. A computer program according to claim 14, wherein said code for the setting step sets the print limit for the number of print sheets.

16. A computer program according to claim 14, wherein said code for the setting step sets the print limit for the number of lines.

17. A computer program according to claim 14, wherein said code for the receiving step receives the E-mail in accordance with a predetermined access interval.

* * * * *